(12) United States Patent
Gibbs et al.

(10) Patent No.: US 7,441,047 B2
(45) Date of Patent: Oct. 21, 2008

(54) DEVICE SPECIFIC PAGINATION OF DYNAMICALLY RENDERED DATA

(75) Inventors: Matthew E. Gibbs, Redmond, WA (US); Shanku S. Niyogi, Bellevue, WA (US); Greg D. Schechter, Seattle, WA (US); Kristen Nilsen Nye, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1089 days.

(21) Appl. No.: 10/172,938

(22) Filed: Jun. 17, 2002

(65) Prior Publication Data

US 2003/0236917 A1     Dec. 25, 2003

(51) Int. Cl.
*G06F 15/16* (2006.01)
(52) U.S. Cl. ..................... 709/248; 709/224
(58) Field of Classification Search ............. 707/513; 709/215, 241, 246, 248, 200–203, 217–227
See application file for complete search history.

(56) References Cited

U.S. PATENT DOCUMENTS

| 6,430,624 | B1* | 8/2002 | Jamtgaard et al. | 709/246 |
| 2002/0059367 | A1* | 5/2002 | Romero et al. | 709/203 |
| 2002/0116534 | A1* | 8/2002 | Teeple | 709/246 |
| 2002/0129016 | A1* | 9/2002 | Christfort et al. | 707/6 |
| 2003/0110234 | A1* | 6/2003 | Egli et al. | 709/217 |

OTHER PUBLICATIONS

"Framework for Adaptive Content Delivery in Heterogeneous Network Environments", by Wei-Ying Ma et al., Proceedings of SPIE—vol. 3969; Multimedia Computing and Networking 2000, Klara Nahrstedt, Wu-chi Feng, Editors, Dec. 1999, pp. 86-100.*

J. Gonzalez el at.; "Optimizing Web Newspaper Layout using Simulated Annealing" 1999; pp. 1-10.

* cited by examiner

*Primary Examiner*—Moustafa M Meky
(74) *Attorney, Agent, or Firm*—Amin, Turocy & Calvin, LLP

(57) ABSTRACT

The present invention relates to a system and methodology that provides for adjusting content that is to be received and displayed by a device so that the content is meaningful to a recipient. The invention provides for rendering of variable-sized pages of dynamic content based at least in part on user interface (UI) characteristics of a receiving device (e.g., client program). One particular aspect of the invention provides for an abstraction layer that permits a content developer to specify what content is to be displayed to an end user without requiring the developer to delineate markup tags that are to be employed by different browsers of respective mobile devices. Thus, for example, such aspect of the invention provides for automatically adjusting (e.g., paginating) content into variable-sized pages appropriate for a requesting device. A content analyzer receives and analyzes content to be rendered at a plurality of recipient devices against display capabilities of the respective devices. An abstraction layer accesses information relating to capabilities of the devices, and maps attributes relating to the content to the device capabilities, the abstraction layer provides the mapping to the content analyzer. A content distributor parses the content into subsets coincident with the display capabilities of the respective devices, and sequentially distributes respective subsets to the devices for rendering thereof.

36 Claims, 12 Drawing Sheets

FIG. 6

610 — PRIME NUMBERS
2, 3, 5, 7, 11, 13, 17, 19, 23, 29, 31, 37, 41, 43, 47, 53, 59, 61, 67, 71
Next

620 — PRIME NUMBERS
73, 79, 83, 89, 97, 101, 103, 107, 109, 113, 127, 131, 137, 139, 149, 151, 157, 163, 167, 173
Previous — Next

630 — PRIME NUMBERS
179, 181, 191, 193, 197, 199, 211, 223, 227, 229, 233, 239, 241, 251, 257, 263, 269, 271, 277, 281
Previous — Next

DEVICE SPECIFIC PAGINATION OF DYNAMICALLY RENDERED DATA

TECHNICAL FIELD

The present invention relates generally to computer systems, and more particularly to a system and method providing information in a manner coincident with capabilities of a receiving device and/or preferences of a recipient.

BACKGROUND OF THE INVENTION

With the growth of computer and information systems, and related network technologies such as wireless and Internet communications, ever increasing amounts of electronic information are communicated, transferred and subsequently processed by users and/or systems. As an example, web browsers have become a popular application among computer users for generating and receiving content. With the advent of the Internet, for example, exchanging content (e.g., messages, files, web pages) has become an important factor influencing why many people acquire computers. However, with the heightened popularity of web browsers and other information transfer systems, problems have begun to appear with regards to managing, processing and rendering increasing amounts of content among a plurality of recipient device types.

The variety of devices that can access the internet includes not only traditional personal computers (PCs), but also cellular telephones, pocket organizers, auto PCs, etc. Many of such devices access the Internet through wireless networks and can be subjected to constraints with respect to the amount of data that can be transmitted to the device for display on a single page. As market forces continue to drive an ever increasing demand for portable computing devices and foster an environment for introducing new devices into the marketplace, the matrix of device display capabilities will continue to increase. Consequently, rendering content in a meaningful manner across a spectrum of differing devices becomes increasingly challenging. Moreover, markup language (e.g., hypertext markup language (HTML), compact hypertext markup language (cHTML), wireless markup language (WML), handheld wireless markup language (HDML)) capabilities as well as processing power with respect to the plurality of portable computing devices add to the complexity of data rendering among disparate and differing types of receiving devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology that provides for adjusting content that is to be received and displayed by a device so that the content is meaningful to a recipient. The invention provides for rendering of variable-sized pages of dynamic content based at least in part on user interface (UI) characteristics of a receiving device (e.g., client program). One particular aspect of the invention provides for an abstraction layer that permits a content developer to specify what content is to be displayed to an end user without requiring the developer to delineate markup tags that are to be employed by different browsers of respective mobile devices. Thus, for example, such aspect of the invention provides for automatically adjusting (e.g., paginating) content into variable-sized pages appropriate for a requesting device.

The invention provides for a content provider/developer to simply specify basic constraints (e.g., grouping, headers, footers, adjustable content) regarding content provided, and the invention adjusts the content in accordance with such constraints as well as capabilities associated with recipient devices so that the content is presented in a meaningful manner. It is to be appreciated that devices not only vary with respect to UI capabilities but also with respect to processing capabilities. Accordingly, another aspect of the invention provides for controlling content delivery in accordance with such constraints. For example, one receiving device may have significant UI and processing capabilities and content can be rendered on such device with minor modifications, while another device with limited capabilities may lead to the invention modifying the content (e.g., trimming, chunking, paginating) in accordance with the respective device capabilities.

Moreover, a plurality of parameters can be configured in conjunction with various configuration and adjustment options to facilitate personalization of the user interface according to user desires. Personalization can include such features as employing explicit or implicit user feedback relating to how content is classified and subsequently provided to the user. Feedback can be employed to guide learning and decision policies with respect to rendering of content. Configuration and adjustment options can include profile options, routing options, alerting options, chunking options, schedule options, and other context-sensitive control options for controlling rendering of content. Additionally, the invention can employ default settings with respect to various types of recipient devices as well as employing an inference system to infer (given various uncertainties) how content should be rendered on a particular device. Various state information (e.g., time of day, type of content, recipient) can be employed in connection with decision making by the inference system in connection with meaningful rendering of content on recipient devices in accordance with the subject invention.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF DRAWINGS

FIG. 6 illustrates a device display that allows for scrolling of content as well as modifying of content in accordance with the present invention.

DETAILED DESCRIPTION OF THE INVENTION

Figure 1:
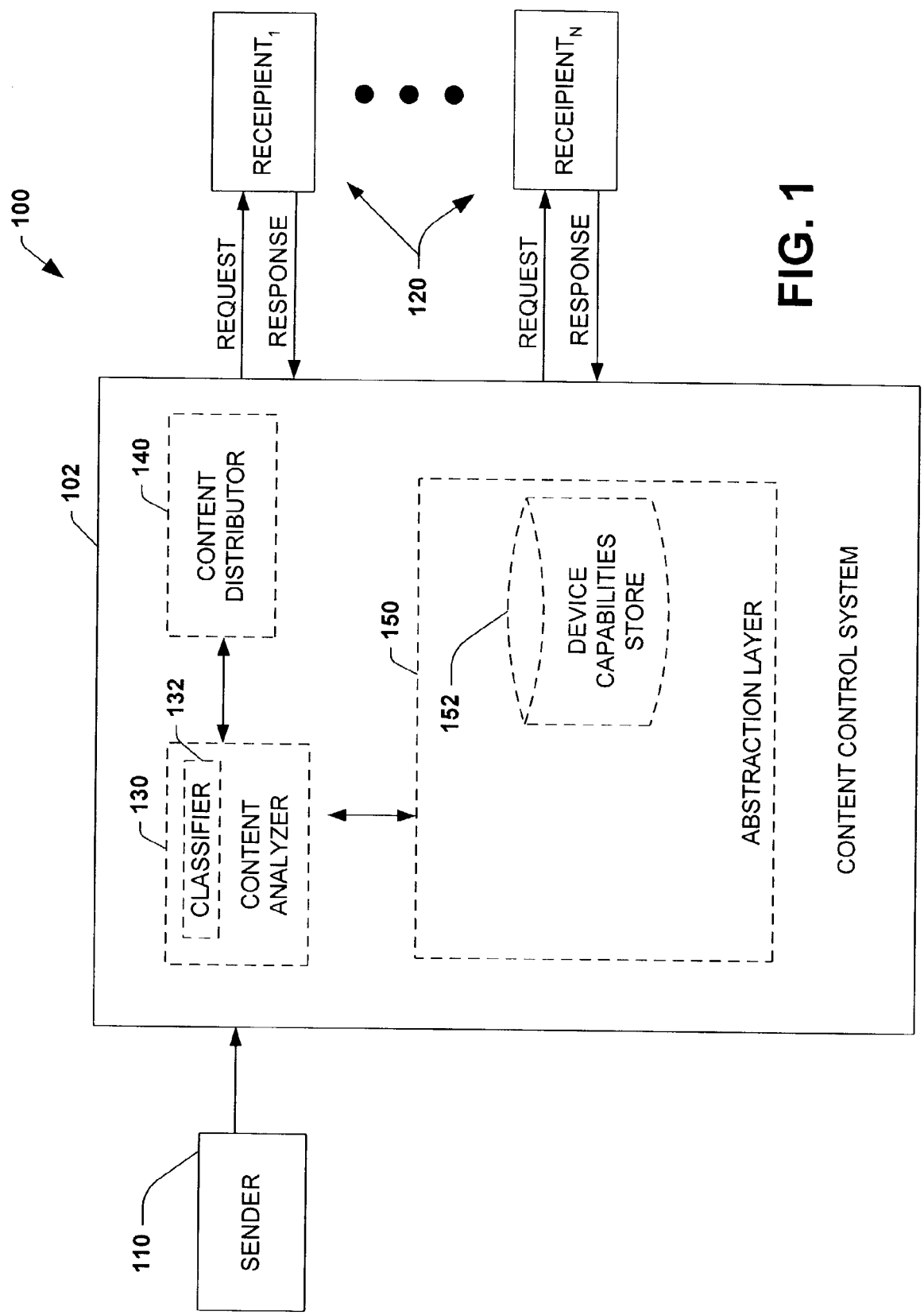
FIG. 1 is a schematic block diagram of a system employing content control in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, any or all of the functionality associated with modules, systems and/or components discussed herein can be achieved in any of a variety of ways (e.g. combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (ORDBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

Referring initially to FIG. 1, a system 100 in accordance with the present invention is illustrated. The system 100 provides for rendering of dynamically generated content in accordance with display and/or functional capabilities of a recipient device. A content originator 110 (sender) generates content that is to be rendered by one or more recipients 120 ($RECIPIENT_I$-$RECEIPIENT_N$, N being an integer). As can be appreciated, the recipients 120 can be of differing types and have capabilities that vary with respect to one another. For example, one of the recipient devices can be a cellular telephone with a limited amount of display real estate as well as processing capabilities, another recipient device could be a portable computer that is wireless enabled and have significant display capabilities as well as processing abilities. Yet another device (e.g., personal data assistant (PDA) could reside somewhere in between the aforementioned devices with respect to capabilities. However, one common thread with respect to these devices is that they are intended recipients of common content. The subject system 100 facilitates rendering such content in a meaningful manner and in accordance with capabilities associated with each respective recipient device 120.

A content control system 102 receives the content that is to be disseminated and analyzes the content with respect to capabilities of the recipient devices 120, and provides for proper rendering of the content by the recipient devices 120. The content control system 102 includes a content analyzer 130 that analyzes the content with respect to device capabilities. Any suitable component for carrying out the functions of the content analyzer 130 may be employed and is intended to fall within the scope of the hereto appended claims. For example, the content analyzer 130 can employ a content classifier 132, which can facilitate automatic classification of content. The classifier 132 can be trained explicitly and/or implicitly to perform classification in terms of dynamic rendering of content. Explicit training is generally conducted at the initial phases of constructing the classifier 132, while implicit training is typically conducted after the classifier 132 has been constructed. Specific description is made herein with reference to a Support Vector Machines (SVM) classifier, for exemplary purposes of illustrating a classification training and implementation approach. Other classification or diagnostic methods that can be handcrafted and/or learned from data include Bayesian networks, decision trees, and probabilistic classification models providing different patterns of independence may be employed. Classification as used herein also is inclusive of statistical regression that is utilized to develop models of urgency or other measures of priority influencing content rendering.

According to one aspect of the invention, the use of the SVM method is employed as the classifier 132. It is to be appreciated that other classifier models may also be utilized such as Naive Bayes, more general probabilistic dependency models referred to as Bayesian networks, decision trees, and other learning models, including hierarchically structured versions of these models, where alternate layers employ the same or a different classifiers SVM's are configured via a learning or training phase within a classifier constructor and feature selection module 132. A classifier is a function that maps an input attribute vector, $x=(x1, x2, x3, x4, xn)$, to a confidence that the input belongs to a class—that is, $f(x)$ =confidence(class). In the case of content/text classification, attributes are words or phrases or other domain-specific attributes derived from the words (e.g., parts of speech, presence of key terms), and the classes are categories of various kinds, such as for example important versus non-important content.

The content analyzer 130 accesses an abstraction layer 150 in connection with its analysis. The abstraction layer 150 provides for a content developer to specify content that is to be displayed at the recipient(s) 120 without requiring the developer to delineate what markup tags are employed by different browsers of the recipient devices 120. In other words, the abstraction layer 150 provides for transparently mapping a set of high-level control instructions in connection with content rendering into lower level instructions implemented at the recipient device(s) for rendering of the content.

The invention provides for rendering of variable-sized pages of dynamic content based on UI characteristics of the recipient(s) 120. The abstraction layer 150 accesses a device capabilities store 152 that holds parameters relating to capabilities (e.g., UI, processing . . . ) of the recipient devices 120. When a dynamically generated content (e.g., web page) is executed, objects in the content hierarchy are traversed to render markup for the appropriate device. The markup language may be HTML, cHTML, WML, etc., for example. The invention thus provides for automatically modifying (e.g., parsing, paginating, chunking, trimming, . . . ) the content in a manner coincident with capabilities of the recipient device 120.

More particularly, the content analyzer 130 processes a request for content from the recipient(s), identifies the type of recipient device as well as properties associated with the requested content. The abstraction layer 150 correlates the recipient device identification to capabilities associated with such device identification—the device type capabilities stored in the device capabilities store, for example. The abstraction layer 150 maps the particular content as well as developer preferences for content rendering with the device capabilities and provides the content analyzer 130 with a rendering scheme for providing the content to the recipient device 120. A content distributor 140 facilitates dissemination and rendering of the content to/at the recipient devices 120. As will be discussed in greater detail below, the content distributor 140 can also facilitate chunking the content into subsets for appropriate consumption by the recipient devices 120 in accordance with respective device capabilities. Therefore, the content does not need to be stored or cached at an intermediary device (e.g., at a server—which can be wasteful utilization of computing resources), but rather provided by the sender 110 in batches coincident with content consumption by the recipient device 120.

It is to be appreciated that the content control system 102, content analyzer 130, classifier 132, content distributor 140, abstraction layer 150, device capabilities store 152 can be components as that term is employed herein.

Figure 2:
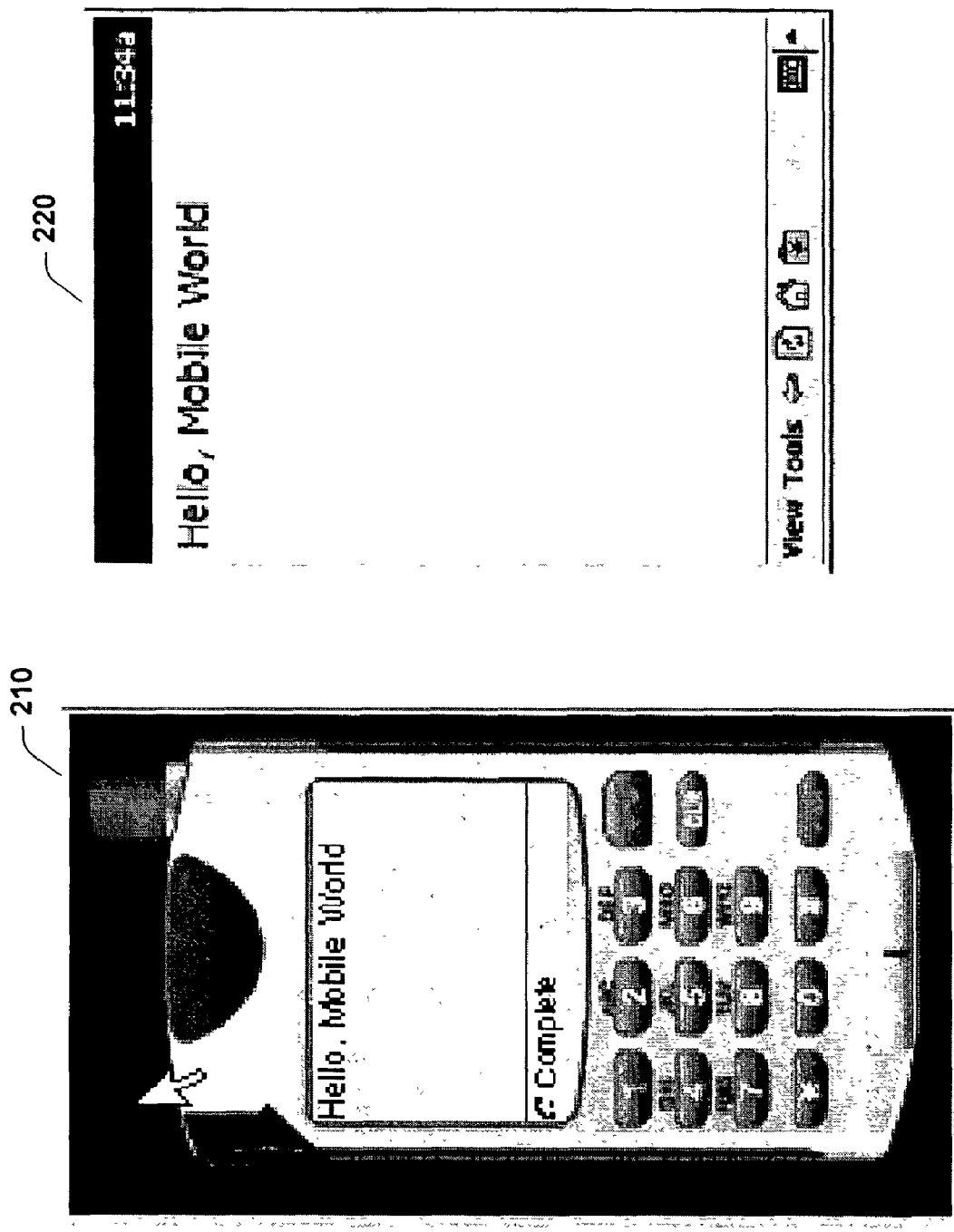
FIG. 2 is a schematic block diagram of a content control system residing at a content originating device in accordance with an aspect of the present invention.

With reference to FIG. 2, the following example illustrates developer programming in connection with the present invention. In this example, a Hello, World program creates a mobile Web Forms page with a single form on it—that form contains a Label control with the string: "Hello, Mobile World".

```
<%@ Page language="c#"
    Inherits="System.Web.UI.MobileControlsMobilePage" %>
<%@ Register TagPrefix="Mobile"
    Namespace="System.Web.UI.MobileControls"
    Assembly="System.Web.Mobile"%>
<mobile:Form id=Form1 runat="server" >
<mobile:Label id=Test Runat="Server" >
```

-continued

```
Hello, Mobile World</mobile:Label>
</mobile:Form>
```

As can be seen in FIG. 2, the above code renders differently on respective devices 210 and 220. The first device 210 is a cellular telephone running a wireless application protocol (WAP) browser that supports WML. The second device 220 is Pocket PC running an HTML browser. Via the abstraction layer 150 (FIG. 1), mobile controls can be established that provide for generating customized markup for respective recipient devices 120.

As noted above, the device capabilities store 152 holds information relating to capabilities of the recipient devices 120. The store provides the content control system 102 with accurate information (e.g., display capabilities) of the recipient devices 120 to facilitate successful rendering of mobile controls. For example, mobile controls in connection with content rendering in accordance with the subject invention might require the following information regarding a particular recipient device 120:

(a) markup language (e.g., HTML, cHTML, WML) associated with the device,;
(b) type of browser employed by the device;
(c) number of display lines;
(d) cookie support;
(e) screen size.

Figure 3:
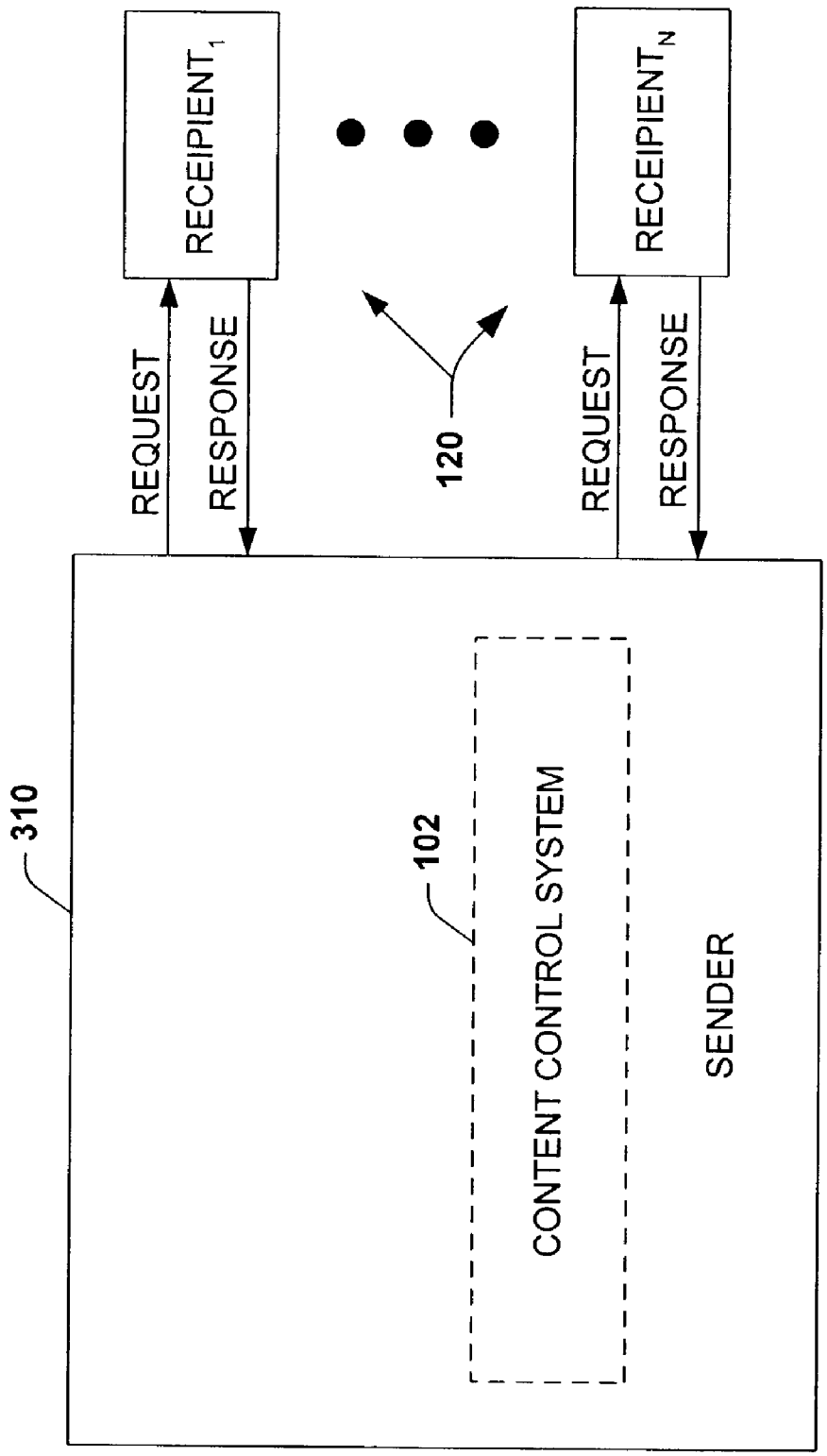
FIG. 3 is a schematic block diagram illustrating both content originator and content recipient running content control systems respectively in accordance with an aspect of the present invention.
Figure 4:
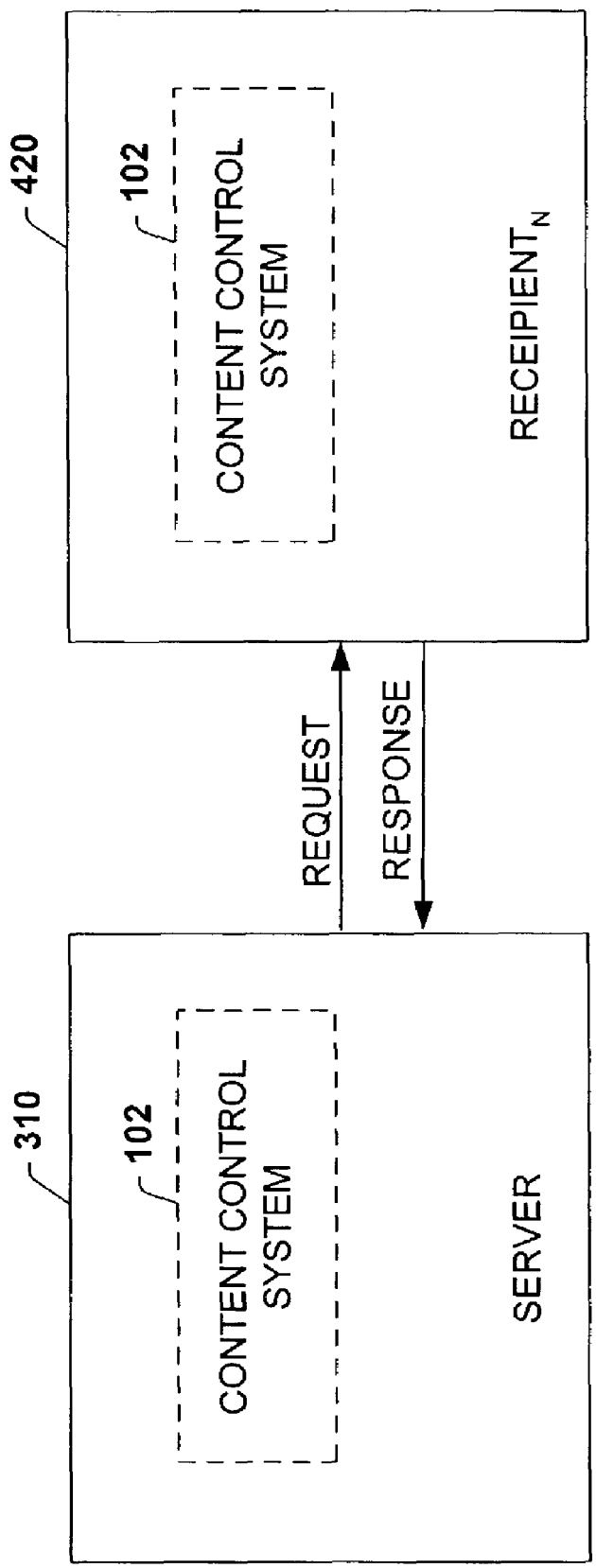
FIG. 4 illustrates content being displayed on two different types of devices in accordance with the present invention.

Turning now to FIGS. 3 and 4, it is to be appreciated that the content control system 102 of the subject invention can reside at a variety of locations. For example, the system 102 could reside at a server, or at a sending device/system 310 as depicted in FIG. 3. Moreover, the system 102 could reside at recipient devices 420 as shown in FIG. 4 alone or in combination with also residing at a server and/or sending device. Moreover, the content control system 102 could reside in a distributed manner across a network of computing devices. In the event more than one content control system 102 is engaged in connection with rendering content on a particular device, any suitable protocol (e.g., master/slave, conflict resolution, arbitrating, collaboration) for governing meaningful rendering of the content can be employed.

Figure 5:
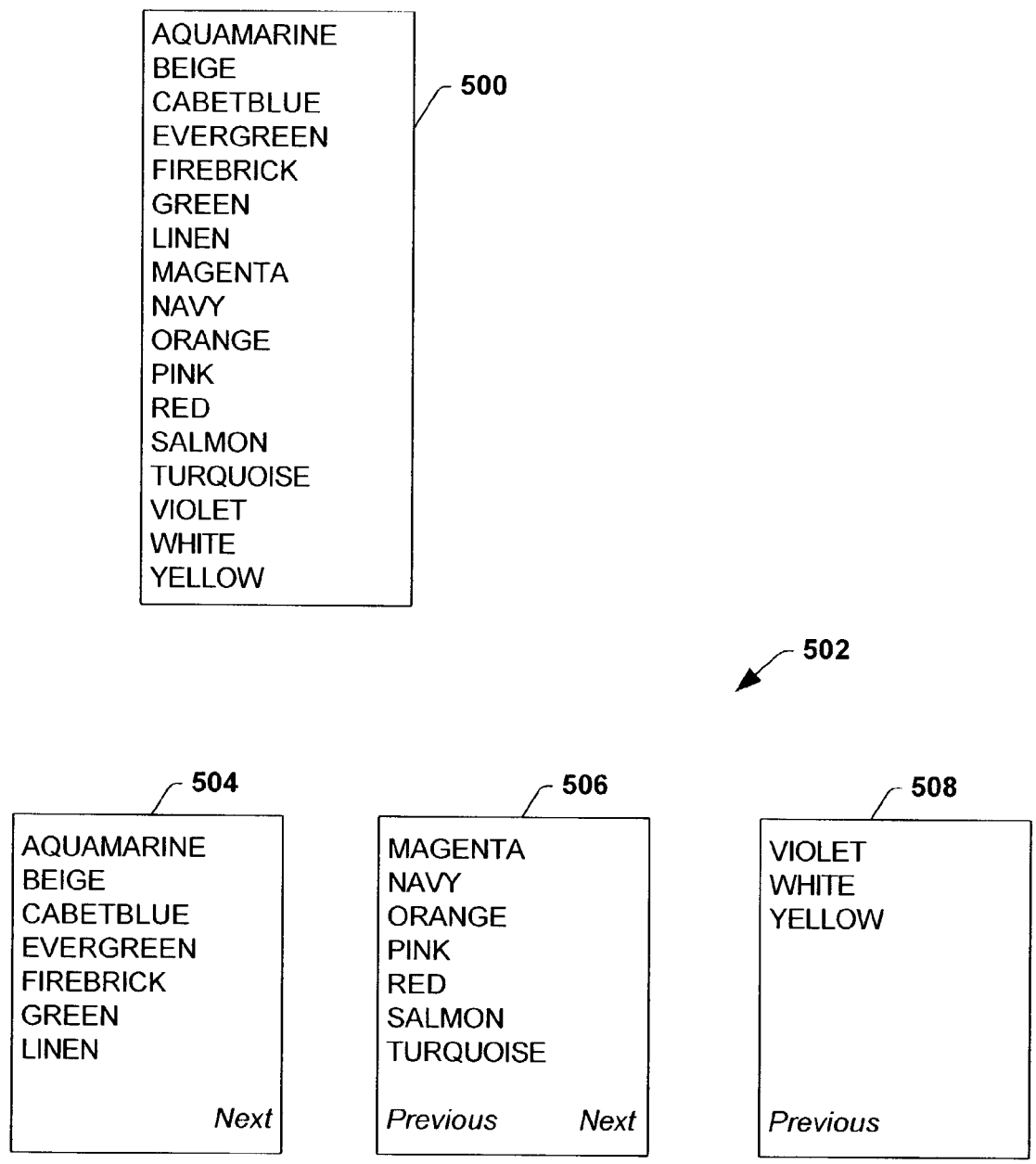
FIG. 5 illustrates various content remaining static with respect to being displayed and other content being modifiable in accordance with the present invention.

FIG. 5 illustrates pagination of content in accordance with the present invention. Reference number 500 identifies a display associated with a device having capabilities for displaying a full amount of content as compared to the display 502 (shown in several states: 504, 506, 508) of another device with limited capabilities as compared to the device of display 500. The content control system 102 (FIG. 1) of the invention provides for automatically breaking up the content into variable-sized content (e.g., web pages) appropriate for the requesting devices 500, 502. The entire content can be displayed on the screen of device 500, while on the smaller device 502 with more limited capabilities, the content rendering appears as several pages comprising subsets of the original content. Navigation between the respective pages 504, 506, 508 (via "Next" and "Previous" links) can be generated and managed automatically as discussed in greater detail below.

Turning now to FIG. 6, it is to be appreciated that content can be set so as to have certain portions remain static (e.g., not modifiable) and other portions designated as being modifiable. Several pages 602 for displaying content on a particular device are illustrated with some static content (e.g., headers 650 and footers 660) and modifiable content (e.g., list of prime numbers 670). Accordingly, a developer can designate certain content (e.g., title, page number, next and previous page links) to appear on every generated web page (form). As can be seen, the static content 650, 660 remains essentially consistent with respect to each generated page 610, 620, 630; while the list of prime numbers is paginated in accordance with display capabilities (e.g., screen space) of the rendering device. However, it is to be appreciated that elements like the header 650 can be dynamically generated, but retain a static presence with respect to generated content. Additionally, elements such as the pager 660 can be introduced by the system in order to facilitate user interaction with modified content.

Below is exemplary code for carrying out such functionality in accordance with the present invention.

```
<%@ Page Inherits="System.Web.UI.Mobilecontrols.MobilePage"
Language="VB" %>
<%@ Register TagPrefix="mobile"
Namespace="System.Web.UI.MobileControls"
Assembly="System.Web.Mobile" %>
<script runat="server" language="VB">
Protected Sub Page_Load(sender As Object, e As EventArgs)
    If (Not IsPostBack)
        ' Find all primes between 1 and 500, using a sieve and
        ' ignoring even numbers greater than 2.
        Dim item As new MobileListItem("2")
        Primes.Items.Add(item)
        Dim isCounted(501) As Boolean
        Dim i As Integer = 3
        Do While (i <= 500)
            If(isCounted(i) = False)
                Dim newItem As New MobileListItem(i.ToString( ))
                Primes.Items.Add(newItem)
                Dim multiple As Integer = i * 3
                Do While (multiple <= 500)
                    isCounted(multiple) = True
                    multiple = multiple + i * 2
                Loop
            End If
            i = i + 2
        Loop
    End If
End Sub
</script>
<mobile:Form runat="server" Paginate="true">
    <DeviceSpecific><Choice>
        <HeaderTemplate>
            <mobile:Label runat="server" StyleReference=
                "title" Text="Prime Numbers"/>
        </HeaderTemplate>
    </Choice> </DeviceSpecific>
    <mobile:List runat="server" id="Primes" />
</mobile:Form>
```

Figure 7:
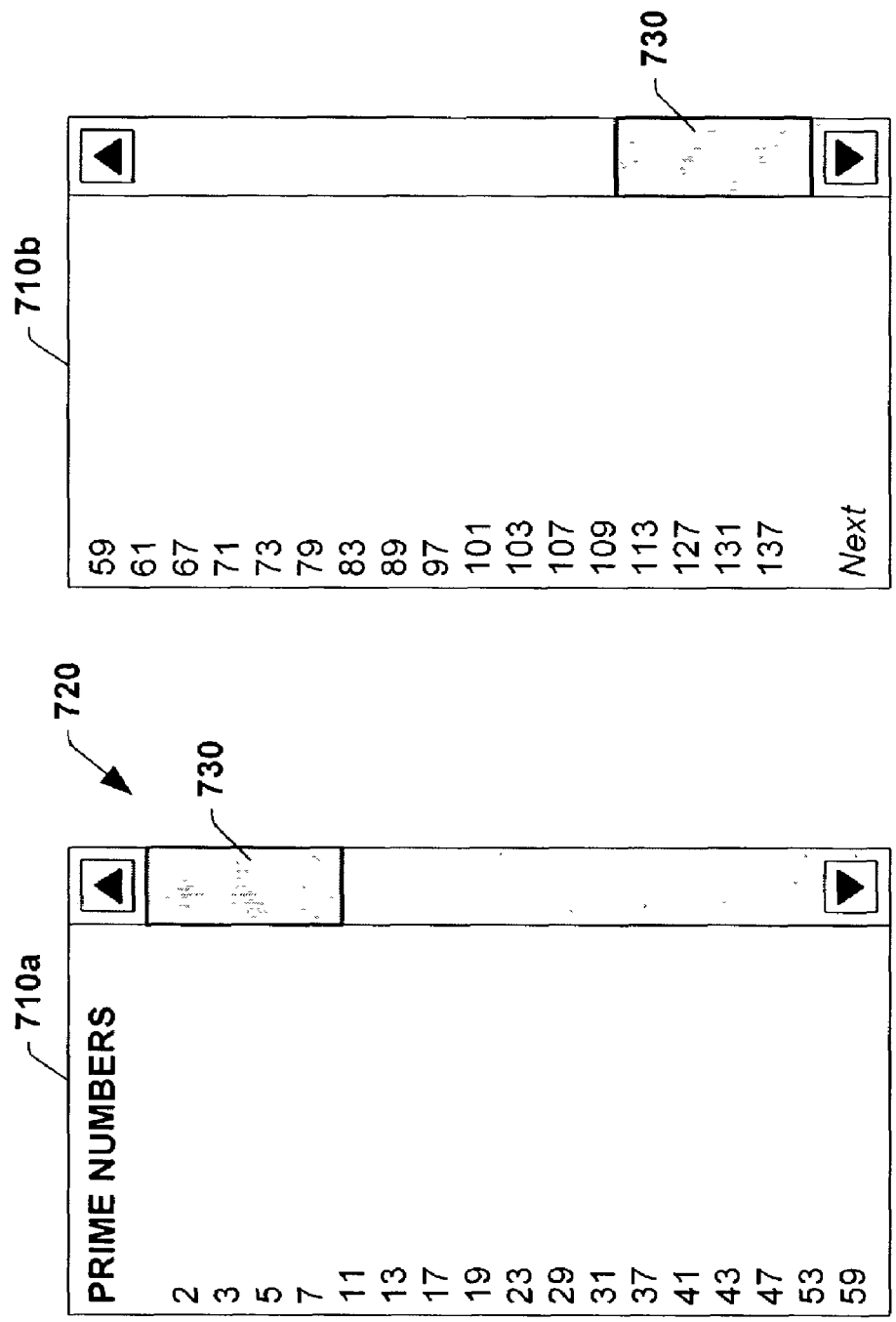
FIG. 7 is a diagram illustrating a high-level methodology in accordance with the present invention.

FIG. 7 illustrates another aspect of the invention pertaining to optimization of content modification based on device capabilities. For example, some devices provide scrolling capabilities and thus content may be rendered in a more meaningful manner if rendered such that more content is exposed on a single web page than there is display space available. However, the scrolling option affords a user to view all content within a particular page via scrolling downwards or upwards. Regarding optimization, it is appreciated that for an extremely large content (e.g., 1000 prime numbers) scrolling on a single page becomes cumbersome and less valuable to a user. Accordingly, the subject invention provides for paginating content at a suitable place within the content taking into consideration whether scrolling functionality is available as well as available display space, etc.

Depending on the content, a developer may decide that certain controls should be grouped or paneled together in order to provide for meaningful rendering of content. Accordingly, the content control system 102 in connection with modification of the content can expose such grouped controls together (e.g., not split or modify) in accordance with the developer's preference for meaningful rendering of the content. Likewise, certain content may be entirely designated as not modifiable by the developer, and in such circumstance the content is rendered in its original form to the extent possible by the recipient device. 120.

A pagination algorithm in accordance with the present invention, based on projected markup language for a particular page to be generated as well as device characteristics of a particular recipient device 120, will determine where to delineate between respective controls of a tree of controls including delineation within a respective control. By such delineation determination, the pagination algorithm facilitates the content control system 102 rendering a sequence of pages on the recipient device(s) 120 that still retain the same functional value of an original form.

Moreover, it is to be appreciated that a variety of optimization schemes can be employed in connection with meaningful rendering of content. For example, the device store 152 (FIG. 1) can store a variety of attributes (screen space, processing capabilities, display capabilities, available functions, etc.) associated with capabilities of the recipient device. The content analyzer 130 and abstraction layer 150 can optimize rendering of the content given the particular capabilities of the content and recipient device. Moreover, it is to be appreciated that user preferences can also be employed in connection with content rendering optimization. The type of content as well as user preferences for viewing the type of content can be considered as factors by the content control system 102 in connection with rendering the content.

Figure 8:
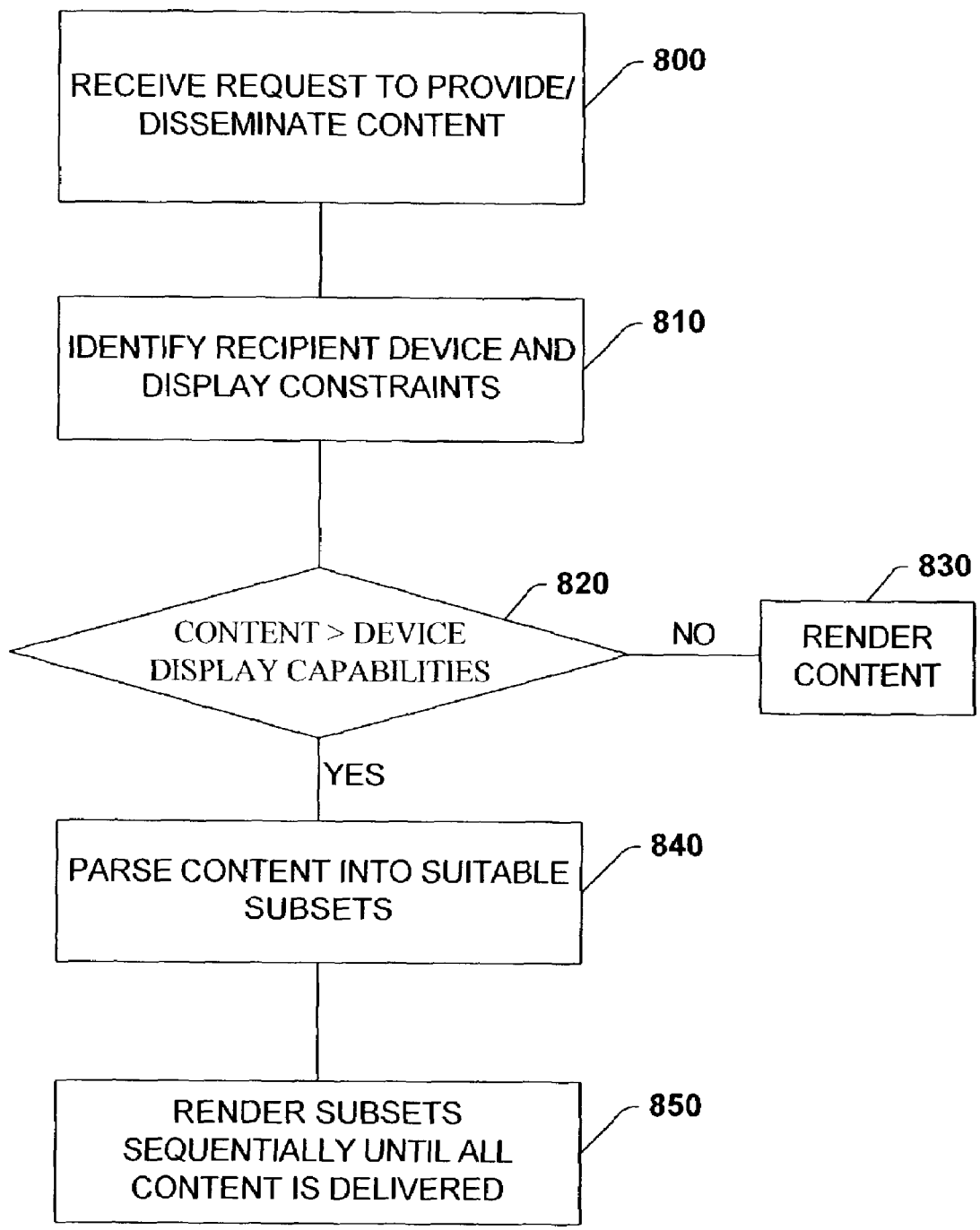
FIG. 8 is a diagram illustrating one particular methodology for modifying content in accordance with the present invention.
Figure 9:
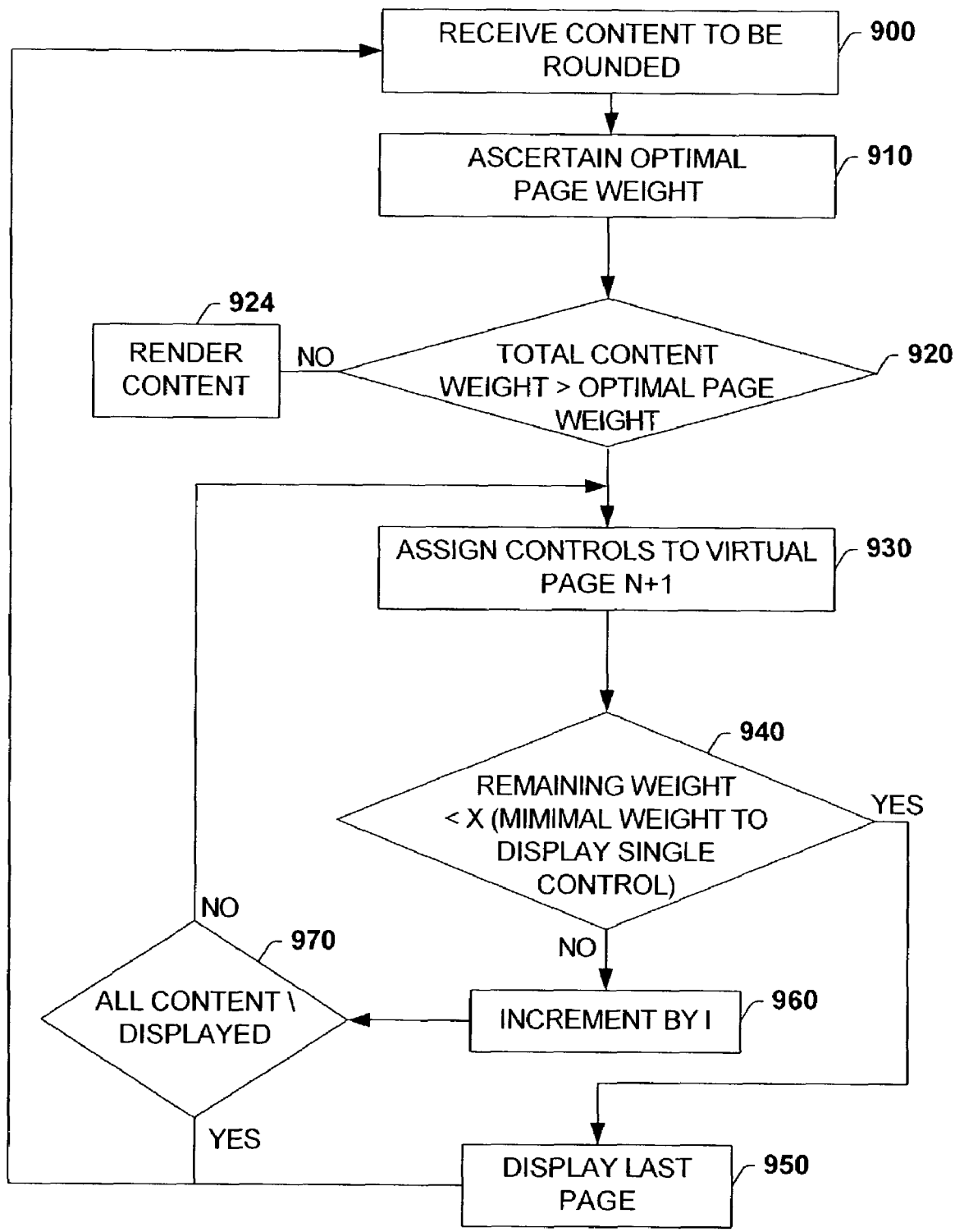
FIG. 9 is a schematic illustration of a content control system interoperating with various devices of differing capabilities in accordance with the present invention.

In view of the exemplary systems shown and described above, methodologies that may be implemented in accordance with the present invention, will be better appreciated with reference to the flow charts of FIGS. 8 and 9. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

FIG. 8 illustrates a high-level flow diagram for modifying and/or rendering content in accordance with the subject invention. At 800, a request is received to provide and/or disseminate dynamically generated content. Recipient devices for the content are identified as well as associated capabilities (e.g., display constraints, processing capabilities) are identified at 810. At 820, a determination is made as to whether the content to be displayed in full exceeds display capabilities of the recipient device. If no, at 830, the content is rendered. On the other hand, if at 820 a determination is made that the content exceeds device capabilities, the content is modified (e.g., sub-divided, paginated, truncated, compressed) into suitable subsets for rendering at the recipient device. At 850, the subsets of content are sequentially rendered until all content is delivered.

It is to be appreciated that the present invention provides for various protocols with respect to rendering content and optimize utilization of computing resources. For example, in the event a particular content is of considerable size, a recipient device may request the content in batches coincident with consumption of the rendered content subset. Upon completion of a particular content subset, a next subset is requested and passed to the recipient device. Such protocol additionally optimizes resources of a server that may house a content control system in accordance with the subject invention. Rather than requiring the server to maintain all of the content to be rendered, the server can act as a proxy that governs pulling or requesting a next content subset from an originating device and passing the next content subset to the recipient device. Likewise, in the absence of a server running the content control system of the present invention as illustrated in FIGS. 3 and 4, the client can also request subsets of content at a rate coincident with its rate of consumption of the content.

Turning now to FIG. 9, one particular methodology for effecting modification of content in accordance with the subject invention is discussed. At 900, content to be rendered (as well as modified prior to being rendered) is received. At 910, optimal page weight for a recipient of the content is ascertained. Prior to modifying (e.g., paginating) the content, capabilities of the recipient device should be known. As discussed supra, such device capabilities can be stored in the device capabilities store 152 (FIG. 1). Such device capability information can include a definition of optimum page weight, which is a limit of the amount of visible content that should be sent to the recipient device for a single viewable page. The optimal page weight can be for example a function of the number of lines considered appropriate for the recipient device 120. For example, if the device can reasonably display ten lines of content, then the optimum page weight would be 1000 or 100 units per line. For a display with twice the number of vertical display lines, the optimal page weight would double to 2000. The number of units per line should remain consistent with the derivation when pagination occurs. More particularly, when an output from a control is being counted against such limit, the value of a single line should be consistent with the recipient device configuration.

As will be discussed, panel control and classes that derive from it (e.g., Form), can have a Boolean property for controlling whether or not the contents should be considered for pagination. When pagination occurs, if the Boolean is true, the contents are recursively considered and assigned a virtual page number. Thereafter, in a rendering phase, a virtual page is selected for display. The render methodology associated with each control in an active form is called and will emit content, if and when, the respective virtual page assignment corresponds to the current virtual page.

Thus, after the optimal page weight is ascertained at 910, a determination is made at 920 if the total content weight exceeds the optimal page weight. If no, at 924 the content is rendered. If at 920, it is determined that the total content weight exceeds the optimal page weight at 930 controls are assigned to virtual page$_{N+1}$ (N starting at 0). As noted above, if the virtual page assignment for the control corresponds to the current virtual page the content relating to the control is rendered. At 940, if the remaining content weight is less than X (the minimal weight required to display a single control) the content is displayed as a last display page. If the remaining content weight>X, the count with respect to virtual page assignment is incremented by one. At 970, a determination is made as to whether all content has been displayed. If no, the methodology returns to 930—if yes, the methodology returns to 900.

In order to provide more context for understanding the above methodology, we return to the example where the optimal page weight is 2000. When pagination begins, the optimal page weight is ascertained—other variables are initialized for the process as well. The remaining weight is equal to the optimum page weight and the virtual page is set to 1. Suppose that the optimal page weight for the requesting browser is 2000, and then the remaining weight is initially 2000. The calculation for the respective form control itself does not affect the remaining weight as it does not produce visible content. Each child of the control is considered in turn and the variables are affected by the value reported by the control. For this example, each label simply counts as 1 visible line, or 100 points against the limit. As each control is considered, the remaining weight is reduced for that control and the virtual page is assigned to the control. At the end of 17 labels, the remaining weight would be 300 and each control would have a virtual page of 1.

Considering a second example display with a device having an optimum page weight of 700, the first seven controls would be assigned a virtual page of 1, but then the remaining weight has been reduced to 0. The next control can therefore not be assigned to that virtual page as it would make the combined total of the virtual page exceed the configured optimum value. Accordingly, the remaining weight is reset to the optimum page weight of 700, and the virtual page is incremented to 2. The next seven controls are then assigned to virtual page 2 as again the remaining weight is again reduced to 0. The remaining weight is again reset to the optimum value and the virtual page is incremented to the assign the last three controls to virtual page 3. When the browser first requests the page, the current page is set to 1. When the controls are rendered, they only display content if their virtual page corresponds to the current page. Thus, the first seven controls are displayed. Additionally, a "pager" is rendered to allow the user to request the next virtual page. When the user follows the "Next" link, the current page is set to 2, the pagination occurs again as part of the page processing, and all controls with the corresponding virtual page rendered content.

It is to be appreciated that the methodology of FIG. 9 can be applied to clustered or grouped sets of controls as well. In particular, a developer may desire to have a subset of controls rendered concurrently in order to provide for meaningful rendering of the original content. Thus, the optimal page weight can be compared against a weight associated with the entire subset alone or in conjunction with other subsets in connection with rendering thereof on a recipient device 120. It is also to be appreciated that the weights of the controls can be dependent upon the type of recipient device. For example, an adapter can be employed to assign a weight to a control given various device and control characteristics such as for example the markup language being employed. Thus, the control weights can be variant and assigned different weights corresponding to state of execution, for example.

The present invention also provides for other functionality to facilitate enabling a developer to exploit the invention. For example, a page can expose a "Control to Paginate" property that allows pagination to be off in general, but to be programmatically asserted so that a subset of controls can be carried across multiple pages. The controls can also expose a paginated event that is executed when the pagination occurs so that function delegates can customize output. Furthermore, custom pagination can allow a developer to specify a fixed number of items to be displayed per page, regardless of capabilities of the requesting device.

Figure 10:
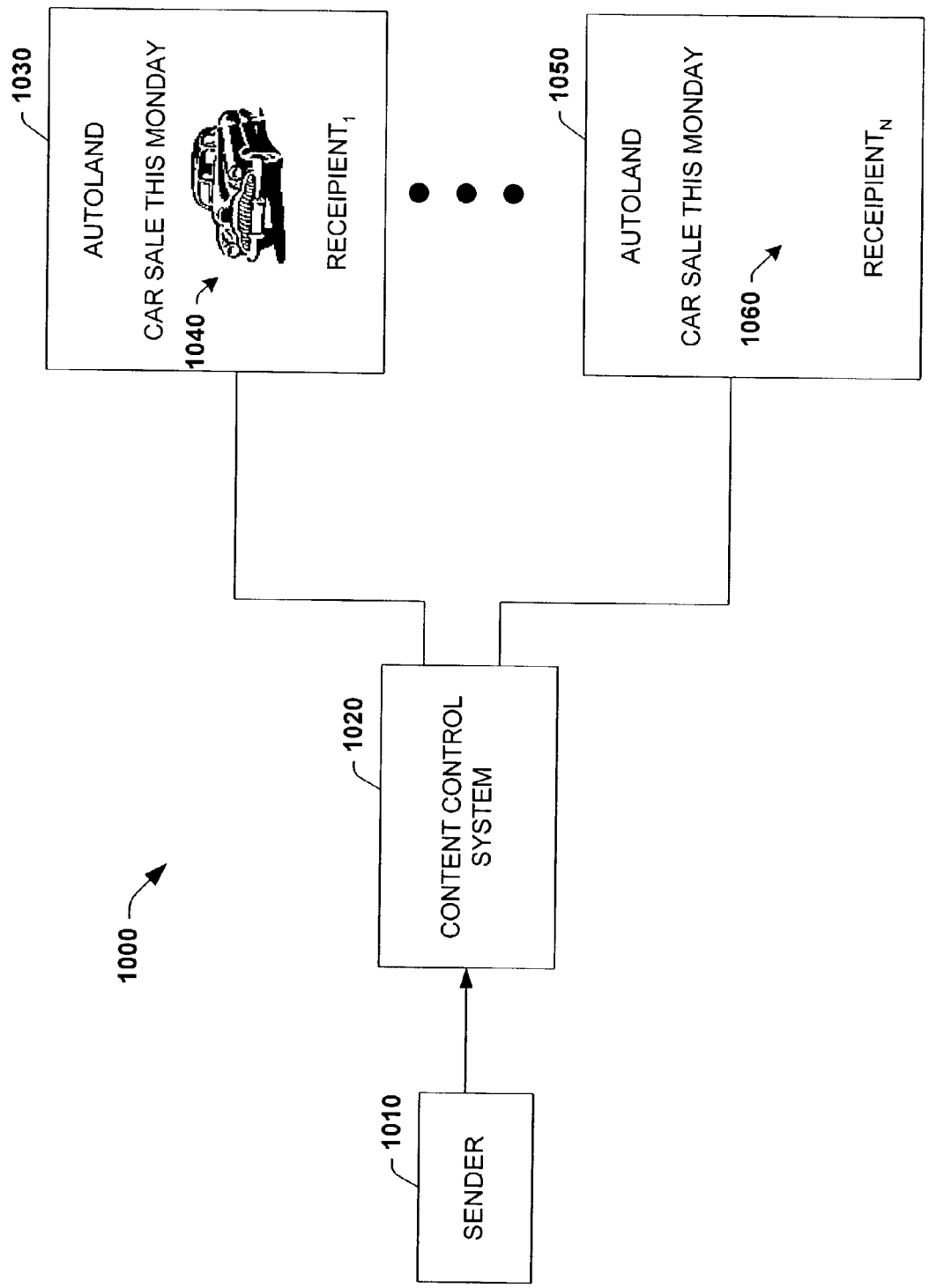
FIG. 10 is a diagram illustrating a content control a system that manipulates content in connection with display and processing capabilities of receiving devices.

FIG. 10 illustrates another aspect of the subject invention which provides for a system, 1000 that manipulates content in connection with display and processing capabilities of receiving devices. A sender 1010 provides content to be rendered at various recipient devices 1030 and 1050. Recipient device 1030 has significant display and processing capabilities while device 1050 has limited capabilities as compared to device 1030. The content to be rendered relates to a web page conveying information relating to a Monday car sale by AutoLand. The content control system 1020 analyzes the content against respective capabilities of the devices 1030 and 1050 and modifies the content for rendering on each device in accordance with the device capabilities. As can be seen since the device 1030 has greater capabilities the content was only slight modified and rendered in at or close to original form—thus a picture of a car is also rendered in the display area 1040 of the device. Device 1050 on the other hand has limited capabilities and thus the content control system 1020 modified the content so that the picture of the automobile is not rendered in the display area 1060 of the device, but the meaningful information "AutoLane car sale this Monday" is displayed.

Figure 11:
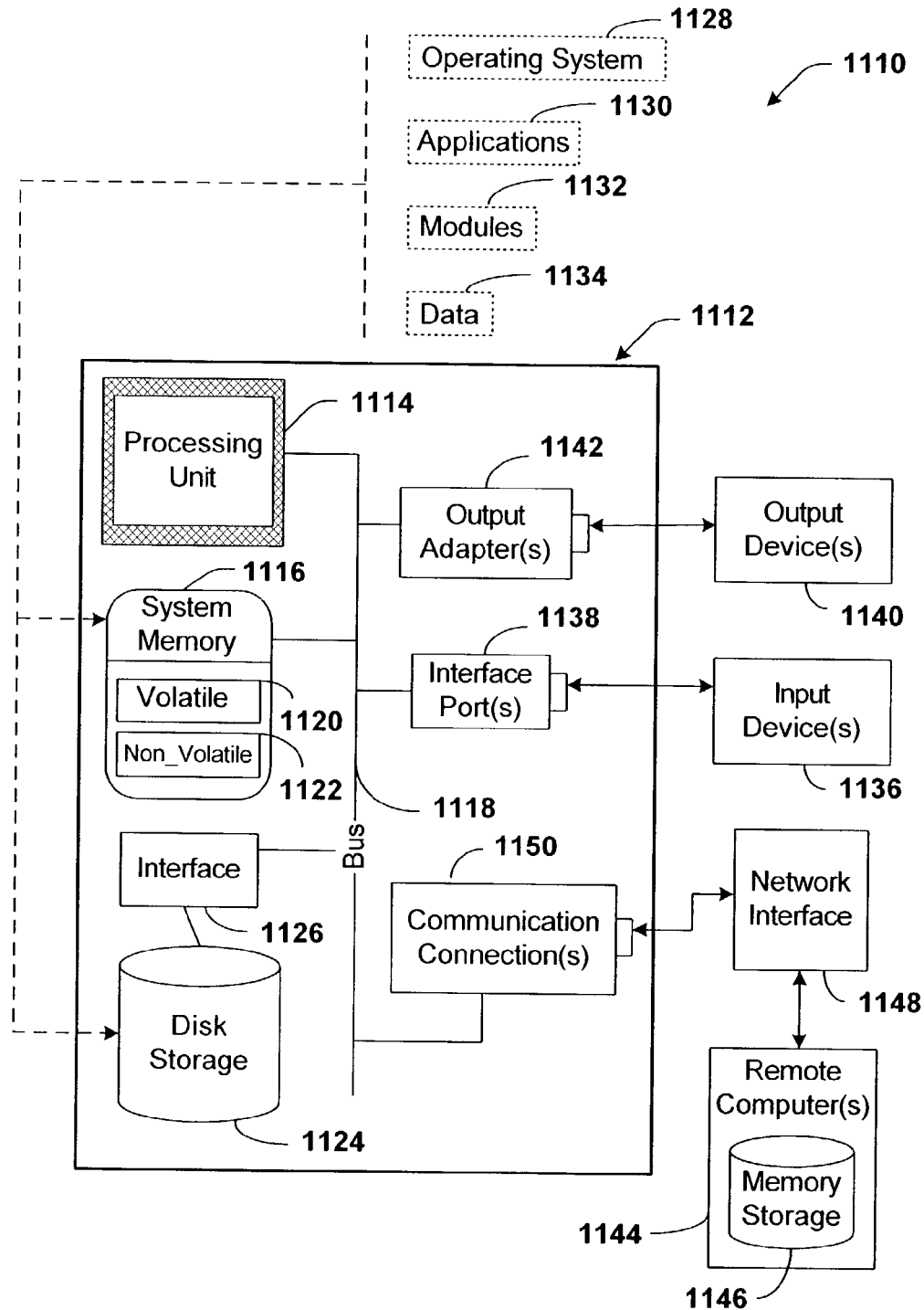
FIG. 11 is a schematic block diagram of an exemplary operating environment for a system configured in accordance with the present invention.

In order to provide additional context for various aspects of the present invention, FIG. 11 and the following discussion are intended to provide a brief, general description of a suitable operating environment 110 in which various aspects of the present invention may be implemented. FIG. 11 provides an additional and/or alternative operating environment in which the present invention can operate. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jazz drive, Zip drive, LS-100 drive, flash memory card, or memory stick. In addition, disk storage 1124 can include storage media separately or in combination with other storage media including but not limited to an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. The operating system 1128, which can be stored on disk storage 1124, acts to control and allocate resources of the computer system 1112. System applications 1130 take advantage of the management of resources by the operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer 1144. The remote computer 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer 1144. Remote computer 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
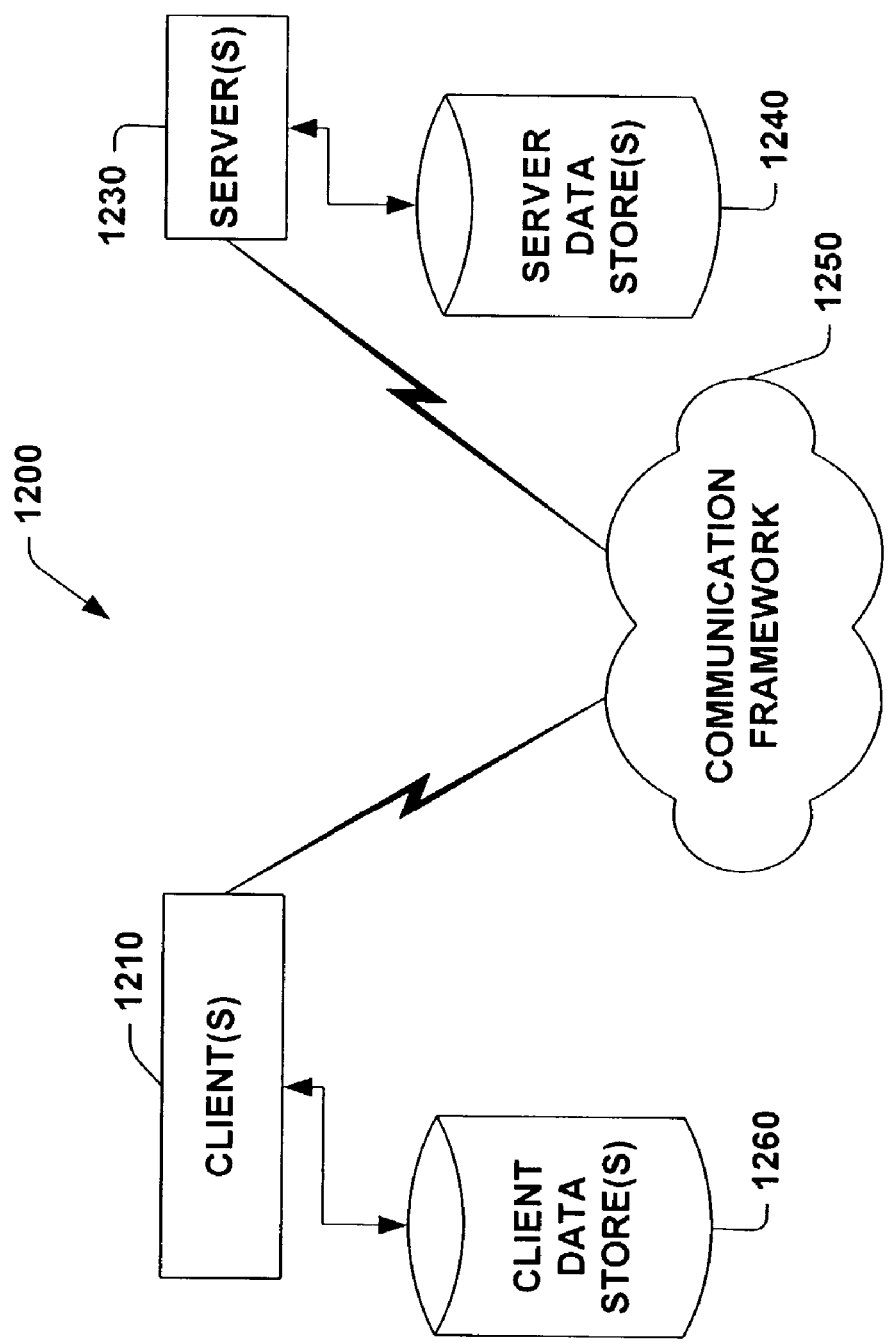
FIG. 12 is a schematic block diagram of a sample-computing environment with which the present invention can interact.

FIG. 12 is a schematic block diagram of a sample computing environment 1200 with which the present invention can interact. The system 1200 includes one or more client(s) 1210. The client(s) 1210 can be hardware and/or software (e.g. threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

It is appreciated that the systems and methods described herein can be utilized with a variety of suitable components (e.g., software and/or hardware) and devices and still be in accordance with the present invention. Suitable components and devices include MP3 players, DVD players, portable DVD players, CD players, portable CD players, video compact disk (VCD) players, super video compact disk (SVCD) players, electronic book devices, personal digital assistants (PDA), computers, car stereos, portable telephones and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates rendering of dynamically generated content, comprising:
    a content analyzer that analyzes content to be rendered at a recipient device against at least capabilities of the device and modifies the content in accordance with the analysis, wherein the capabilities include a predefined optimum page weight for the device, the optimum page weight is a limit of the amount of content for a single viewable page, the content analyzer paginates the content such that a content weight for each page does not exceed the optimum page weight of the device; and
    a content distributor that facilitates rendering of the modified dynamically generated content by the recipient device.

2. The system of claim 1, further comprising a device capabilities store that holds information relating to capabilities of recipient devices.

3. The system of claim 2, the capabilities including at least one of: display space, display capabilities, cookie handling capabilities, mark up language employed, optimum page weight, processing speed of the device's processing unit, or web browser employed.

4. The system of claim 1, further comprising an abstraction layer that maps content characteristics with capabilities of the recipient device.

5. The system of claim 1, the content weight is based upon a type of the device.

6. The system of claim 1, the content modification comprising chunking of the content.

7. The system of claim 1, the content modification comprising truncating of the content.

8. The system of claim 1, the content modification comprising trimming of the content.

9. The system of claim 1 residing at a server.

10. The system of claim 1 residing at the recipient device.

11. The system of claim 10, the recipient device being a portable computing device.

12. The system of claim 1 residing at a sending device.

13. The system of claim 1, the content being modified and rendered coincident with a markup language suitable for the recipient device.

14. The system of claim 1, the content distributor providing the content in subsets coincident with content consumption capabilities of the recipient device.

15. The system of claim 1, the content being rendered on a plurality of recipient device types, and the content analyzer modifying the content for rendering on each device type in accordance with capabilities of the device types.

16. The system of claim 1, rendering the content such that certain portions are static and other portions are modified in accordance with capabilities of the recipient device.

17. The system of claim 1, the content analyzer optimizing content modification based at least in part on determining that the recipient device has scrolling capabilities.

18. The system of claim 1, the content analyzer optimizing content modification based at least in part on user preferences for content rendering.

19. A computer implemented method for rendering dynamically generated content, comprising:
   determining capabilities of a receiving device, wherein the capabilities include a predefined optimum page weight for the device, the optimum page weight is a limit of the amount of content weight for a single virtual page; and
   modifying the dynamically generated content for suitable rendering on the receiving device, wherein the content is paginated such that a content weight for each page does not exceed the optimum page weight of the device.

20. The method of claim 19 further comprising identifying the recipient device and related capabilities.

21. The method of claim 19 further comprising dividing the content into subsets suitable for rendering on the receiving device.

22. The method of claim 21 further comprising rendering the subsets sequentially in accordance with consumption capabilities of the receiving device.

23. The method of claim 19, further comprising storing device capabilities, the capabilities including at least one of: display space, display capabilities, cookie handling capabilities, mark up language employed, optimum page weight, processing speed of the device's processing unit, or web browser employed vice.

24. The method of claim 19, the content weight is based upon a type of the receiving device.

25. The method of claim 19 further comprising assigning controls for rendering the content to virtual pages, and displaying the controls in accordance with a virtual page protocol.

26. A computer implemented system that facilitates rendering of dynamically generated content, comprising:
   computer implemented means for identifying capabilities associated with a device that will be rendering the dynamically generated content, the capabilities include a predefined optimum page weight for the device, the optimum page weight is a limit of the amount of content weight for a single display page;
   computer implemented means for storing information relating to capabilities of a plurality of device types;
   computer implemented means for modifying the content in accordance with the device capabilities, wherein the content is paginated such that a content weight for each page does not exceed the optimum page weight of the device; and
   computer implemented means for distributing the modified content to the device for rendering.

27. The system of claim 26, the means for storing further storing information relating to user preferences for content rendering.

28. The system of claim 27 further comprising means for mapping content attributes to the device capabilities.

29. A computer readable medium storing computer executable components that implement the system of claim 1.

30. A computer readable medium storing computer executable components for performing the method of claim 19.

31. A computer implemented system that facilitates rendering of dynamically generated content, comprising:
   a content analyzer that receives and analyzes content to be rendered at a plurality of recipient devices against display capabilities of the respective recipient devices, wherein the capabilities include a predefined optimum page weight for the device, the optimum page weight is a limit of the amount of content weight for a single virtual page, the content analyzer paginates the content such that a content weight for each page does not exceed the optimum page weight of the recipient device;
   an abstraction layer that accesses a data store holding information relating to capabilities of the recipient devices, and maps attributes relating to the content to the capabilities, the abstraction layer providing the mapping to the content analyzer; and
   a content distributor that parses the content into subsets coincident with the display capabilities of the respective recipient devices, wherein subsets for a respective recipient device contain an amount of content that does not exceed the predefined optimum page weight for the respective recipient device, and sequentially distributes the subsets for a respective recipient device to the respective recipient devices for rendering thereof.

32. The system of claim 31, the content weight is based upon a type of the receiving device.

33. The system of claim 31, further comprising an inference system that infers a most suitable modification of the content given various uncertainty regarding capabilities of at least one of the receiving devices.

34. The system of claim 33, the inference also considering user preferences for content rendering.

35. The system of claim 31, further comprising a classifier that classifies at least one of the content and device capabilities.

36. The system of claim 35, employing at least one of: Support Vector Machines (SVM), Bayesian networks, decision trees, and probabilistic classification models.

* * * * *

UNITED STATES PATENT AND TRADEMARK OFFICE
CERTIFICATE OF CORRECTION

| | | |
|---|---|---|
| PATENT NO. | : 7,441,047 B2 | Page 1 of 1 |
| APPLICATION NO. | : 10/172938 | |
| DATED | : October 21, 2008 | |
| INVENTOR(S) | : Matthew E. Gibbs et al. | |

It is certified that error appears in the above-identified patent and that said Letters Patent is hereby corrected as shown below:

In column 16, line 42, in Claim 34, delete "33,the" and insert -- 33, the --, therefor.

Signed and Sealed this
Twelfth Day of July, 2011

David J. Kappos
*Director of the United States Patent and Trademark Office*